(12) United States Patent
Kawamura et al.

(10) Patent No.: US 12,116,044 B2
(45) Date of Patent: Oct. 15, 2024

(54) FRAME WHICH IS MADE OF FIBER REINFORCED COMPOSITE

(71) Applicants: MAZDA MOTOR CORPORATION, Hiroshima (JP); NIPPON STEEL Chemical & Material Co., Ltd., Tokyo (JP)

(72) Inventors: Chikara Kawamura, Hiroshima (JP); Yuki Kodama, Hiroshima (JP); Kenji Nishida, Hiroshima (JP); Tetsuya Sugiyama, Tokyo (JP); Koichi Hattori, Tokyo (JP)

(73) Assignees: MAZDA MOTOR CORPORATION, Hiroshima (JP); NIPPON STEEL Chemical & Material Co., Ltd., Tokyo (JP)

( * ) Notice: Subject to any disclaimer, the term of this patent is extended or adjusted under 35 U.S.C. 154(b) by 376 days.

(21) Appl. No.: 17/568,702

(22) Filed: Jan. 4, 2022

(65) Prior Publication Data

US 2022/0297768 A1 Sep. 22, 2022

(30) Foreign Application Priority Data

Mar. 19, 2021 (JP) .................................. 2021-045404

(51) Int. Cl.
*B62D 29/04* (2006.01)
(52) U.S. Cl.
CPC .................................. *B62D 29/04* (2013.01)
(58) Field of Classification Search
CPC .... B62D 29/04; B62D 29/043; B62D 29/041; B62D 29/046; B62D 25/00; B62D 25/025; B62D 25/02; B62D 25/04; B62D 25/20; B62D 25/2018; B62D 25/2027; B62D 25/2036; B62D 25/2054
USPC .... 296/203.01–203.4, 204, 209, 187.09, 0.1, 296/0.11, 0.12, 187.01, 193.06; 293/102, 293/120–122
See application file for complete search history.

(56) References Cited

U.S. PATENT DOCUMENTS 9,452,781 B2 * 9/2016 Kurokawa ............. B62D 21/02
10,399,520 B2 * 9/2019 Kitakata ................. B60R 19/18

FOREIGN PATENT DOCUMENTS

JP 2017-61170 A 3/2017

* cited by examiner

*Primary Examiner* — Dennis H Pedder
(74) *Attorney, Agent, or Firm* — Studebaker & Brackett PC

(57) ABSTRACT

Provided is a frame which is made of a fiber reinforced composite and where a bending strength and a vibration damping capability are compatible. The frame which is made of a fiber reinforced composite includes: a compressive wall part where a compressive stress occurs in a longitudinal direction of the frame when the frame receives a bending load in a normal direction perpendicularly intersecting the longitudinal direction; a side wall part extending in the normal direction and defining one of the corners with the compressive wall part; and a tension wall part which is away from the compressive wall part and extends in the longitudinal direction, and where a tensile stress occurs in the longitudinal direction when the frame receives the bending load. The tension wall part has a loss coefficient which is larger than a loss coefficient of the compressive wall part by 0.005 or more.

10 Claims, 17 Drawing Sheets

FIG.5

| No. | TYPE | STRUCTURE |
|---|---|---|
| I | EXAMPLE | |
| II | COMPARATIVE EXAMPLE 1 | |
| III | COMPARATIVE EXAMPLE 2 | |
| IV | COMPARATIVE EXAMPLE 3 | |
| V | COMPARATIVE EXAMPLE 4 | |

FRAME WHICH IS MADE OF FIBER REINFORCED COMPOSITE

FIELD OF THE INVENTION

The present invention relates to a frame which is made of a fiber reinforced composite.

BACKGROUND ART

A frame which is made of a fiber reinforced composite and has a light weight and high stiffness has been conventionally adopted as a frame forming a body of a vehicle, a member for frame reinforcement, and other member. Such a frame which is made of a fiber reinforced composite has been currently required to have a vibration damping capability.

For instance, Japanese Unexamined Patent Publication No. 2017-61170 discloses a vehicle body reinforcement structure where weight reduction and vibration damping are compatible with a plate member made of a fiber reinforced resin. The vehicle body reinforcement structure is reinforced via a band plate member made of a fiber reinforced resin containing a plurality of fibers. The vehicle body reinforcement structure has a configuration where the fibers are aligned in the fiber reinforced resin in a longitudinal direction of the band plate member having opposite ends respectively connected to a pair of connection sections spaced away from each other in a vehicle width direction of a body of a vehicle, the band plate member receiving a torsion moment when the body is deformed.

Although Japanese Unexamined Patent Publication No. 2017-61170 discloses the structure where the weight reduction and the vibration damping are compatible by the arrangement of the band plate member made of the fiber reinforced resin, the publication fails to disclose a structure where a bending strength and a damping capability of the frame are compatible.

Here, a proposed way to improve the vibration damping capability includes producing a frame entirely made of a fiber reinforced composite, i.e., high damping material, having a high damping capability. However, the high damping material is softer (has a lower stiffness) than a typical fiber reinforced composite irrelevant to the requirement of the damping capability, and thus has a difficulty in achieving an increase in the bending strength. It is seen from these perspectives that the bending strength and the vibration damping capability are in a relation of a trade-off, that is, the bending strength and the vibration damping capability are incompatible or very difficult to be compatible. Accordingly, the high damping material has a problem of its less reliable availability for a portion where an increase in the bending strength and an improvement in the vibration damping capability are required.

SUMMARY OF THE INVENTION

It is an object of the present invention is to provide a frame which is made of a fiber reinforced composite and where the bending strength and the vibration damping capability are compatible.

A frame which is made of a fiber reinforced composite according to the present invention is a frame which is made of a fiber reinforced composite and has a predetermined length and an enclosed cross-section defining a plurality of corners. The frame includes: a compressive wall part where a compressive stress occurs in a longitudinal direction of the frame when the frame receives a bending load in a normal direction perpendicularly intersecting the longitudinal direction; a side wall part extending in the normal direction and defining one of corners with the compressive wall part; and a tension wall part which is away from the compressive wall part and extends in the longitudinal direction, and where a tensile stress occurs in the longitudinal direction when the frame receives the bending load. The tension wall part has a loss coefficient which is larger than a loss coefficient of the compressive wall part by 0.005 or more.

BRIEF DESCRIPTION OF THE DRAWINGS

FIG. 5 is an explanatory view schematically showing a cross-sectional structure of a frame according each of Example and Comparative Examples 1 to 4.

DESCRIPTION OF EMBODIMENTS

Hereinafter, preferable embodiments of the present invention will be described in detail with reference to the accompanying drawings.

Figure 1:
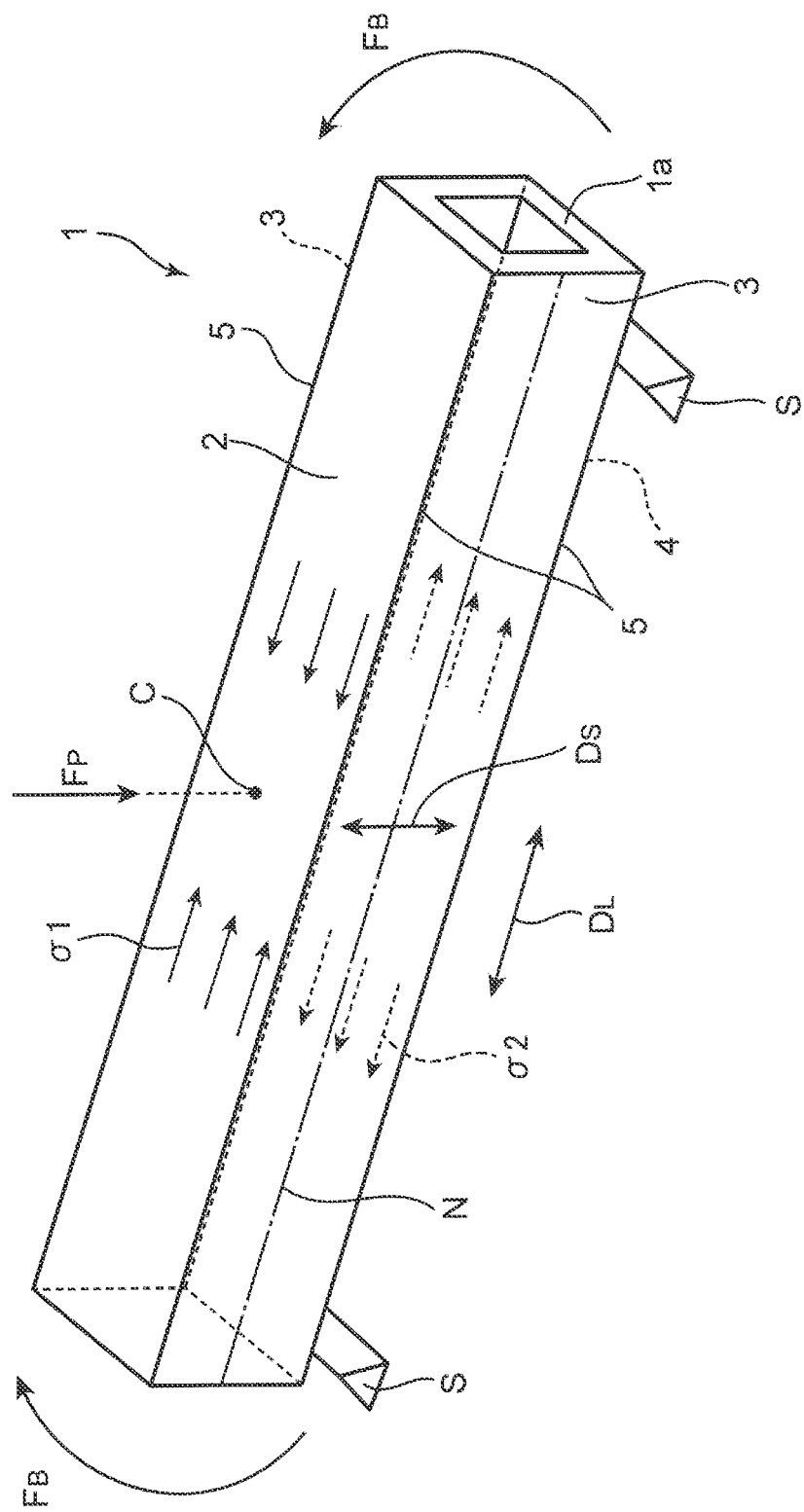
FIG. 1 is a schematic perspective view illustrating an overall configuration of a frame configured by a quadrangular pipe that is a basic structure of a frame which is made of a fiber reinforced composite according to an embodiment of the present invention.
Figure 2:
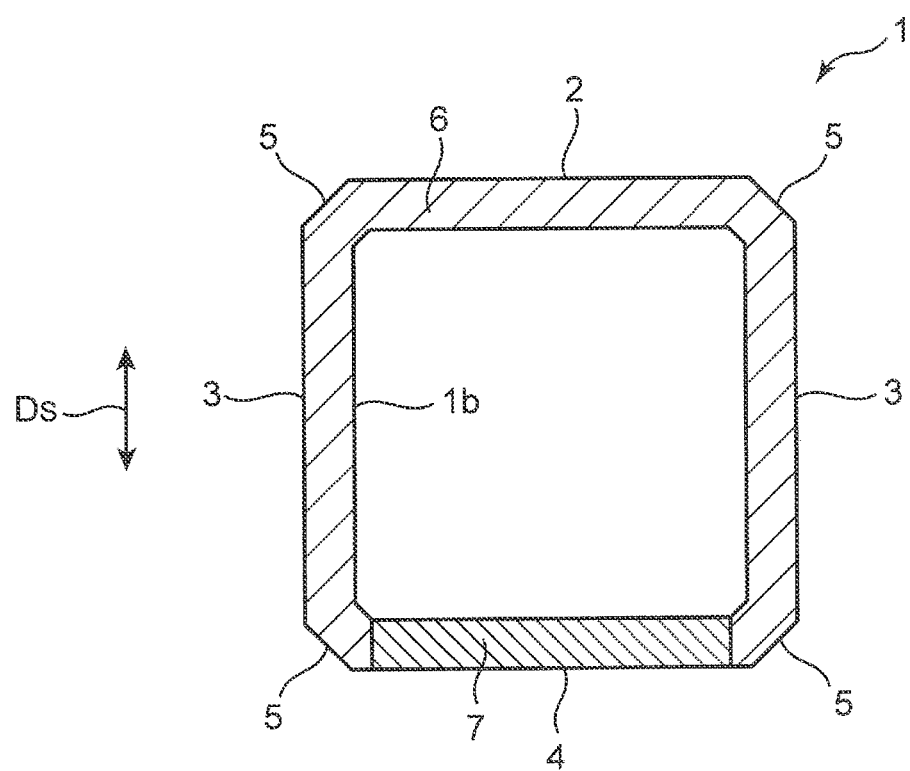
FIG. 2 is a cross-sectional view of the frame which is made of a fiber reinforced composite shown in FIG. 1.

Each of FIGS. 1 to 2 shows a frame configured by a quadrangular pipe that is a basic structure of a frame which is made of a fiber reinforced composite 1 (hereinafter, referred to as "frame 1") according to an embodiment of the present invention. The frame 1 is a member having a high strength and made of a fiber reinforced composite, the frame having a predetermined length (in a longitudinal direction $D_L$ shown in FIG. 1) and an enclosed cross-section 1b defining a plurality of corners 5 and including a plurality of fiber alignment layers (resin layers) 11 to 14 (see FIG. 3). The frame 1 is applied to a member constituting each part of a body 121 (see FIG. 11) of a vehicle to be described later.

Specifically, the frame 1 includes, as a basic configuration, four wall parts extending in the longitudinal direction $D_L$ of the frame 1 and defining four surfaces thereof, i.e., a compressive wall part 2, a pair of side wall parts 3 spaced from each other oppositely in a width direction of the compressive wall part 2, and a tension wall part 4 which is away from the compressive wall part 2 while facing the compressive wall part 2.

The compressive wall part 2, the pair of side wall parts 3, and the tension wall part 4 form an enclosed cross-section 1b defining four corners 5. Each of the corners 5 may be chamfered into a linear or arch shape as shown in FIG. 2.

The compressive wall part 2 is a part where a compressive stress σ1 occurs in the longitudinal direction $D_L$ of the frame 1 when the frame 1 receives a bending load $F_B$ for bending the frame 1 in a normal direction $D_S$ perpendicularly intersecting the longitudinal direction $D_L$ (at an angle of 90 degrees to the longitudinal direction $D_L$). In other words, the compressive wall part 2 results in an inward curving part of the bent frame 1. Here, the normal direction $D_S$ represents a direction perpendicularly intersecting the longitudinal direction $D_L$ of the frame 1, specifically, corresponds to a circumferential direction of the frame 1 which has the predetermined length and a quadrangular tube-like shape, as shown in FIG. 1, the direction crossing the compressive wall part 2, the side wall parts 3, or the tension wall part 4 while perpendicularly intersecting the longitudinal direction $D_L$.

Here, the bending load $F_B$ is enough to work as a load for bending the frame 1 in the normal direction $D_S$ perpendicularly intersecting the longitudinal direction $D_L$ of the frame 1. For instance, the bending load is prospected to occur when the compressive wall part 2 receives a compressive load (impact load) $F_P$ in the normal direction $D_S$, that is, a normal direction of the compressive wall part 2 in FIG. 1, in a state where both ends of the frame 1 are supported as shown in FIG. 1 (e.g., in a state where the two opposite ends of the frame 1 are supported at a pair of fulcrums S in the simplified model shown in FIG. 1) at a collision of the body 121 of the vehicle (see FIG. 11) with an obstacle (other vehicle or an object provided on a road) located outside. In this case, the compressive wall part 2 of the frame 1 receives the compressive load $F_P$.

Figure 11:
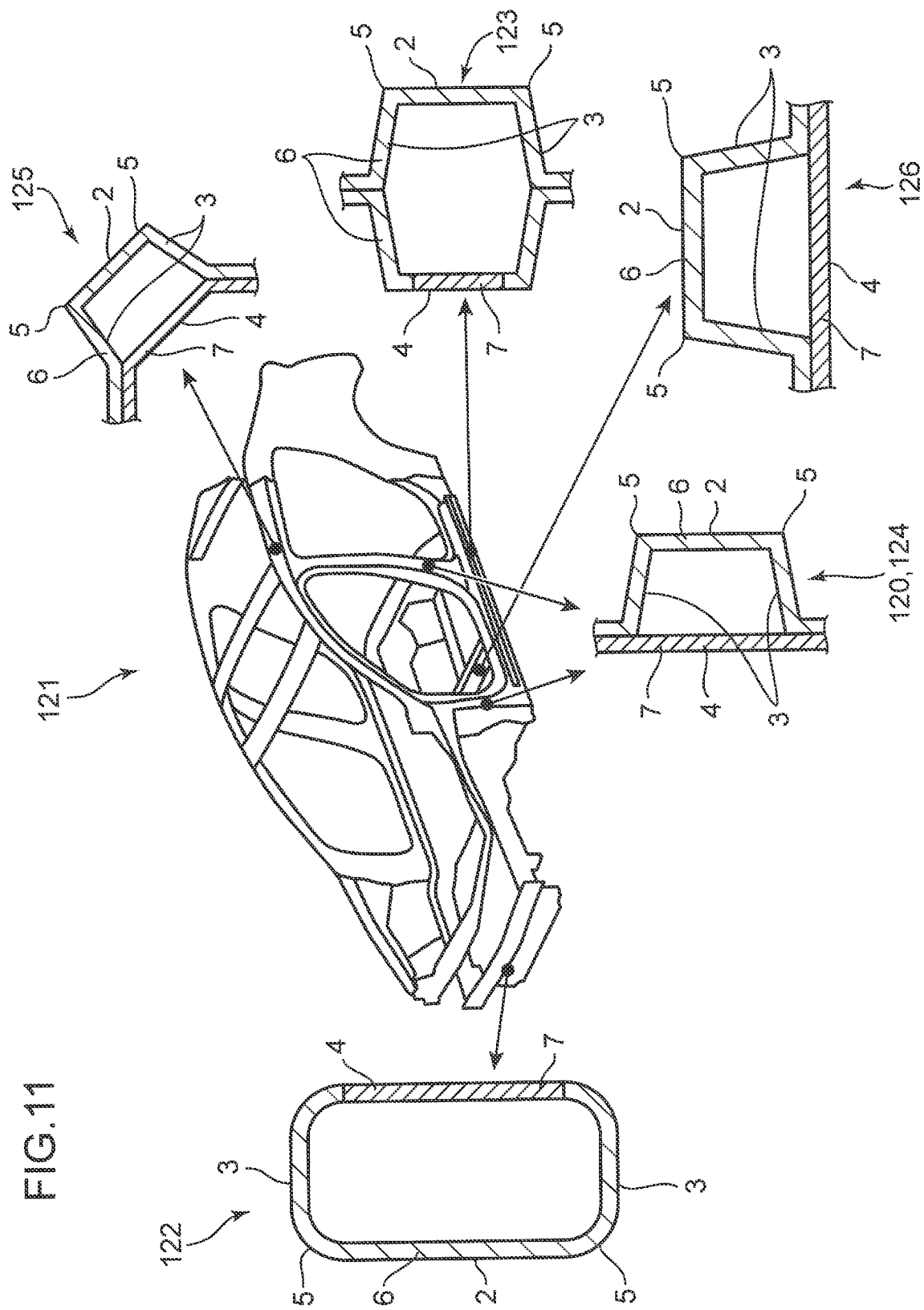
FIG. 11 is a perspective explanatory view showing an example where the frame which is made of a fiber reinforced composite according to the embodiment of the present invention constitutes a structural member of each part of a body of a vehicle.

Alternatively, the bending load $F_B$ is prospected to occur when the frame 1 receives a compressive load (impact load) in the longitudinal direction $D_L$ from an end part 1a of the frame 1 in the longitudinal direction $D_L$ thereof, like a bending load of a crossmember 126 which occurs at a collision of a side part of the body 121 of the vehicle shown in FIG. 11 with an obstacle. In this case, the end part 1a of the frame 1 receives the compressive load.

Each of the side wall parts 3 extends in the normal direction $D_S$ and defining a pair of corners 5 with the compressive wall part 2 (specifically, extends in a direction parallel to a direction in which the bending load $F_B$ occurs or a direction in which the compressive load $F_P$ occurs). The side wall part 3 has a region closer to the compressive wall part 2 than a neutral axis N in FIG. 1 where the compressive stress occurs and another region closer to the tension wall part 4 than the neutral axis N where the tensile stress occurs when the frame 1 receives the bending load $F_B$. Each of the side wall parts 3 and the compressive wall part 2 define a corresponding one of the corners 5.

The tension wall part 4 is a part which is away from the compressive wall part 2 and extends in the longitudinal direction $D_L$, and where a tensile stress σ2 occurs in the longitudinal direction $D_L$ when the frame 1 receives the bending load $F_B$. In other words, the tension wall part 4 results in an outer curving part of the bent frame 1. The tension wall part 4 and each of the side wall parts 3 define a corresponding one of the corners 5.

Figure 3:
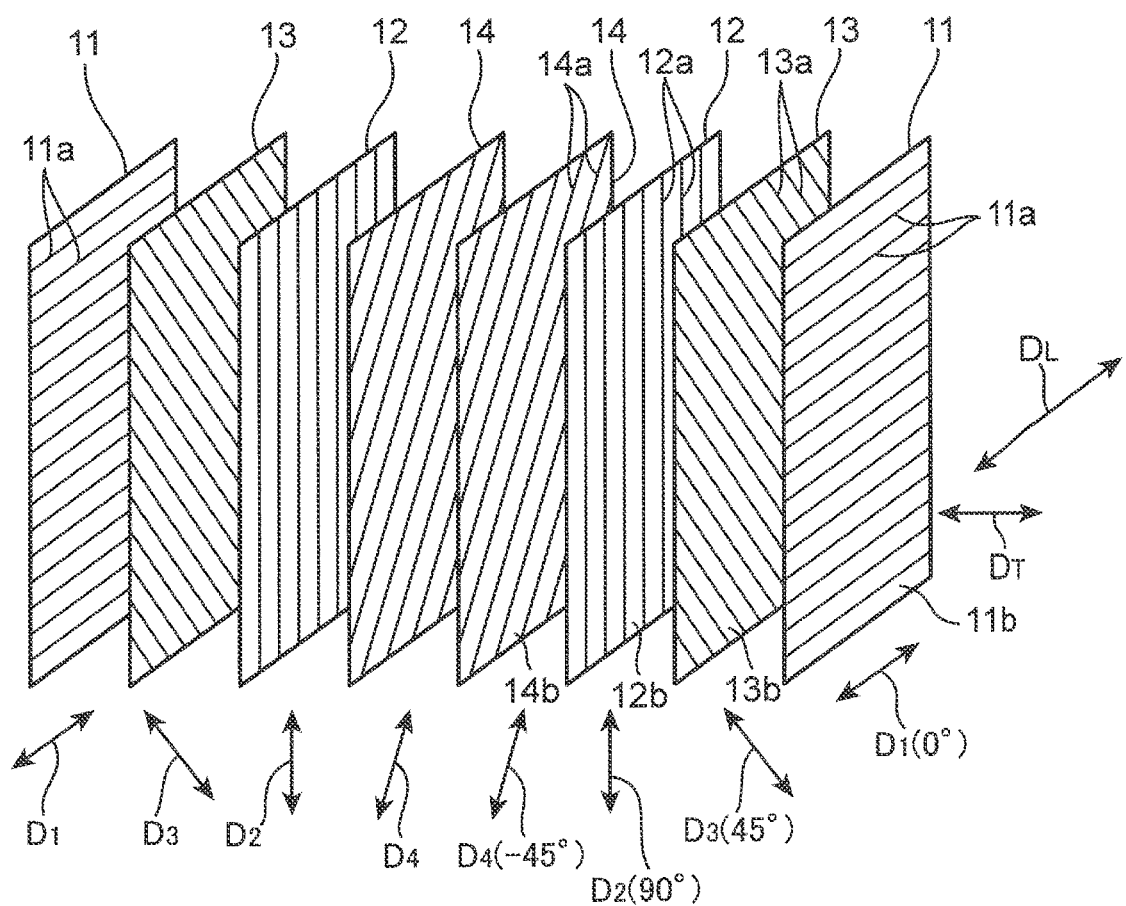
FIG. 3 is an exploded perspective view showing a part of a laminate structure of the frame which is made of a fiber reinforced composite shown in FIG. 2.

Each of the compressive wall part 2, the pair of side wall parts 3, and the tension wall part 4 includes a plurality of fiber alignment layers, e.g., a longitudinal alignment layer 11, a normal directional alignment layer 12 and a +45-degree alignment layer 13, and a −45-degree alignment layer 14, as shown in FIG. 3, lying on one another to be integrated.

Specifically, the compressive wall part 2, the pair of the side wall parts 3, and the tension wall part 4 have the same laminate structure to have, for example, the quasi-isotropic properties as shown in FIG. 3. Specifically, each of the wall parts 2 to 4 is formed of a laminate including, as the fiber alignment layers (resin layers), a plurality of longitudinal alignment layers 11, normal directional alignment layers 12, +45-degree alignment layers 13, and −45-degree alignment layers 14 lying on one another at a substantially equal proportion so as to have the quasi-isotropic properties.

Specifically, the longitudinal alignment layer 11 has a base 11b and reinforcement fibers 11a aligned in a direction $D_1$ corresponding to the longitudinal direction $D_L$ of the frame 1 (at an angle of 0 degree to the longitudinal direction $D_L$) as shown in FIG. 3.

The base 11b (as well as 12b, 13b, 14b) is aimed at a sheet-like base composed of the reinforcement fibers 11a (as well as 12a, 13a, 14a) and a resin for use in autoclave molding or press molding, a base having the reinforcement fibers 11a which are temporarily fixed thereto for use in RTM molding, and the like. The base 11b is made of resin material being excellent in heat resistance, strength, and workability, e.g., a resin, such as an epoxy resin. The reinforcement fibers 11a are made of fiber material having a light weight and a high strength, e.g., carbon fibers, glass fibers, aramid fibers, cellulose fibers, and steel fibers. Particularly, the carbon fibers are preferable in view of excellence in both the light weight and high strength.

Specifically, the normal directional alignment layer 12 has the base 12b and the reinforcement fibers 12a aligned in the normal direction $D_S$ of the frame 1, i.e., a direction $D_2$ perpendicularly intersecting the longitudinal direction $D_L$ (at a tilt angle of 90 degrees) as shown in FIG. 3. The same materials as those respectively used for the base 11b and the reinforcement fibers 11a of the longitudinal alignment layer 11 are used for the base 12b and the reinforcement fibers 12a of the normal directional alignment layer 12 as well, but different materials may be used.

The +45-degree alignment layer 13 has the reinforcement fibers 13a aligned in a direction at a clockwise rotation angle of 45 degrees in an in-plane direction of the alignment layer 13 with respect to the longitudinal direction $D_L$. Similarly, the −45-degree alignment layer 14 has the reinforcement fibers 14a aligned in a direction at a counterclockwise rotation angle of 45 degrees (−45 degrees when the clockwise direction is defined as a positive direction) in an in-plane direction of the alignment layer 14 with respect to the longitudinal direction $D_L$.

Specifically, the +45-degree alignment layer 13 has the base 13b and the reinforcement fibers 13a aligned in a direction $D_3$ at an angle of +45 degrees to the longitudinal direction $D_L$ as shown in FIG. 3. Similarly, the −45-degree alignment layer 14 includes, specifically, the base 14b and the reinforcement fibers 14a aligned in a direction $D_4$ at an angle of −45 degrees to the longitudinal direction $D_L$ as shown in FIG. 3. The same materials as those respectively used for the base 11b and the reinforcement fibers 11a of the longitudinal alignment layer 11 are used for the bases 13b, 14b and the reinforcement fibers 13a, 14b as well, but different materials may be used.

As described above, each of the compressive wall part 2, the side wall part 3, and the tension wall part 4 forming the frame 1 according to the embodiment includes a fiber reinforced composite including the fiber alignment layers (resin layers) 11 to 14 lying on one another.

The present inventors have found that, among the four wall parts forming the frame 1, the compressive wall part 2 makes a large contribution to the bending strength of the frame 1 and the tension wall part 4 makes a small contribution thereto. The inventors then have achieved, based on the knowledge, the frame 1 having compatibility of the bending strength and the vibration damping capability by giving a higher priority to an improvement in the vibration damping capability than an increase in the bending strength in connection with the tension wall part 4.

Specifically, the frame 1 according to the embodiment shown in FIG. 2 has a basic structure based on an enclosed cross-sectional structure including the compressive wall part 2, the pair of side wall parts 3, and the tension wall part 4. In this structure, the tension wall part 4 has a loss coefficient which is larger than a loss coefficient of the compressive wall part 2 by 0.005 or more.

Specifically, the compressive wall part 2 includes a first fiber reinforced composite 6. The tension wall part 4 includes a second fiber reinforced composite 7 having a higher vibration damping capability than the first fiber reinforced composite 6. In the frame 1 shown in FIG. 2, each of the side wall parts 3 which makes a large contribution to the bending strength of the frame 1 subsequent to the compressive wall part 2 includes the first fiber reinforced composite 6 as well.

For instance, the first fiber reinforced composite 6 included in each of the compressive wall part 2 and the side wall part 3 is made of a Carbon Fiber Reinforced Plastic (general CFRP). The general CFRP has a loss coefficient of around 0.013. In contrast, the tension wall part 4 includes a second fiber reinforced composite 7 made of a high damping CFRP. The high damping CFRP has a loss coefficient of around 0.021 which is much larger than a loss coefficient (around 0.001) of steel. Therefore, in this case, the tension wall part 4 made of the high damping CFRP has the loss coefficient (around 0.021) which is larger than the loss coefficient (around 0.013) of the compressive wall part 2 made of the general CFRP by 0.005 or more (specifically, 0.008). The loss coefficient used in the description represents a criterion showing a degree of internal damping of vibration peculiar to a material.

The configuration of the frame 1 including the tension wall part 4 having the loss coefficient which is larger than the loss coefficient of the compressive wall part 2 by 0.005 or more can provide a higher vibration damping effect than a configuration of a frame 1 having a conventional enclosed cross-section 1b defined by metal members (e.g., steel members each having a loss coefficient of around 0.001) having loss coefficients with a difference of fewer than 0.005 therebetween. The high effect is unobtainable by the combination of the metal members. Moreover, the tension wall part 4 where a tensile stress occurs when the frame 1 receives the bending load $F_B$ makes a relatively smaller contribution to the bending strength of the frame 1 than the compressive wall part 2 and the side wall part 3. Hence, the bending strength of the entirety of the frame 1 is ensured even when a higher priority is given to an improvement in the vibration damping capability than an increase in the bending strength by increasing the loss coefficient of the tension wall part 4. Consequently, the frame 1 can have both the bending strength and the vibration damping capability.

In this configuration, the compressive wall part 2 making a large contribution to the bending strength of the frame 1 and including the first fiber reinforced composite 6 further ensures the bending strength, and the tension wall part including the second fiber reinforced composite 7, which has a high vibration damping capability while making a small contribution to the bending strength of the frame 1, achieves an improvement in the vibration damping capability. Consequently, the frame 1 can have both the bending strength and the vibration damping capability. Additionally, an appropriate selection of a composition and thickness of each of the first fiber reinforced composite 6 and the second fiber reinforced composite 7 can further lead to required bending strength and vibration damping capability of the frame 1, which is advantageous for designing and producing the frame 1.

EXAMPLE

Next, a bending strength and a vibration damping capability of a frame 1 according to an embodiment shown in FIG. 4 will be described in comparison with those of a frame according to each of Comparative Examples.

Figure 4:
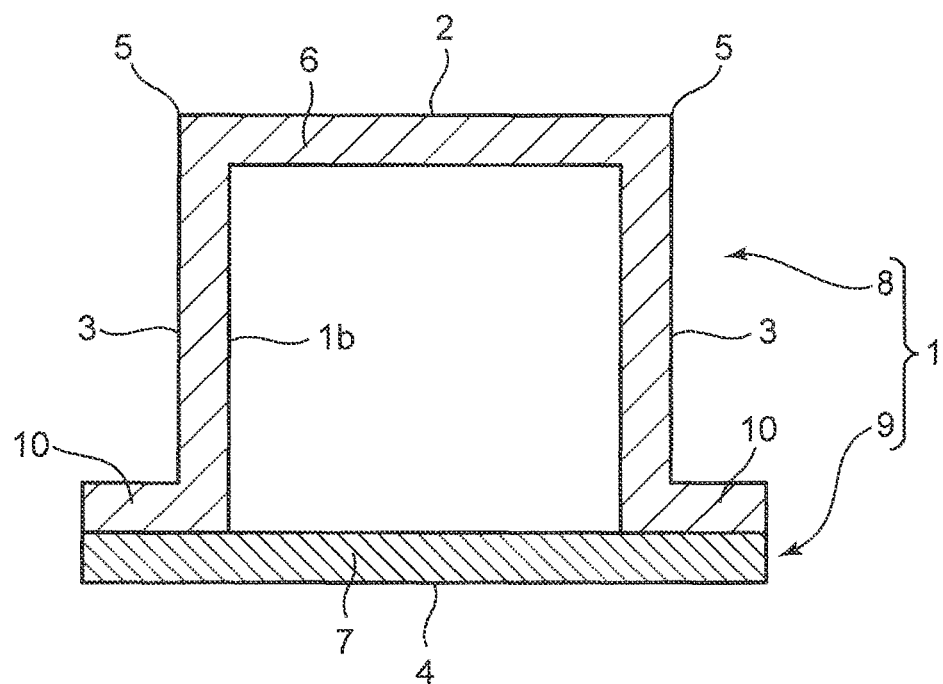
FIG. 4 is a cross-sectional view of a frame including a hat member and a plate member in combination as a frame which is made of a fiber reinforced composite according to an embodiment of the present invention.

The frame 1 according to the embodiment shown in FIG. 4 includes two members, i.e., a hat member 8 (first member) and a plate member 9 (second member). The frame 1 has an enclosed cross-section 1b defined by the hat member 8 and the plate member 9 in combination.

The hat member 8 has a hat-like cross-sectional shape and provided with a pair of flanges 10. The hat member 8 is constituted by a first fiber reinforced composite 6 made of a general CFRP. The hat member 8 constitutes a compressive wall part 2 and a pair of side wall parts 3. The flanges 10 extend outward in a width direction of the hat member 8 respectively from the opposite ends of the side wall parts 3.

The plate member 9 has a flat plate shape and is connected to the pair of flanges 10 to define the enclosed cross-section 1b. The plate member 9 is constituted by a second fiber reinforced composite 7 made of a high damping CFRP and having a higher vibration damping capability than the first fiber reinforced composite 6. The plate member 9 constitutes a tension wall part 4.

Hereinafter, as shown in FIG. 5, four Comparative Examples 1 to 4 will be described in comparison with the frame 1 defined as "I: Example" having the above-described configuration and shown in FIG. 4.

Each of Comparative Examples 1 to 4 shown in FIG. 5 has an enclosed cross-sectional structure including a hat member 8 and a plate member 9 in combination like the frame 1 according to I: Example, and is equivalent to the frame 1 according to Example in that the hat member 8 constitutes a compressive wall part 2 and a pair of side wall parts 3, and the plate member 9 constitutes a tension wall part 4 except that the hat member 8 and the plate member 9 are made of different materials from each other.

Specifically, as shown in FIG. 5, a frame 31 according to II: Comparative Example 1 includes a hat member 8 and a plate member 9 each constituted by a first fiber reinforced composite 6 made of a general CFRP.

A frame 41 according to III: Comparative Example 2 includes a hat member 8 and a plate member 9 each constituted by a second fiber reinforced composite 7 made of a high damping CFRP.

A frame 51 according to IV: Comparative Example 3 includes a hat member 8 and a plate member 9 each constituted by a steel member 16 serving as an exemplary metal material.

A frame 61 according to V: Comparative Example 4 includes a hat member 8 constituted by a steel member 16, and a plate member 9 constituted by a second fiber reinforced composite 7 made of a high damping CFRP.

Concerning the frame according to each of I: Example and II to V: Comparative Examples 1 to 4, a change in a bending load to a displacement in receipt of the bending load was checked. Results of the check are shown by graphs in FIGS. 6 to 7.

Figure 6:
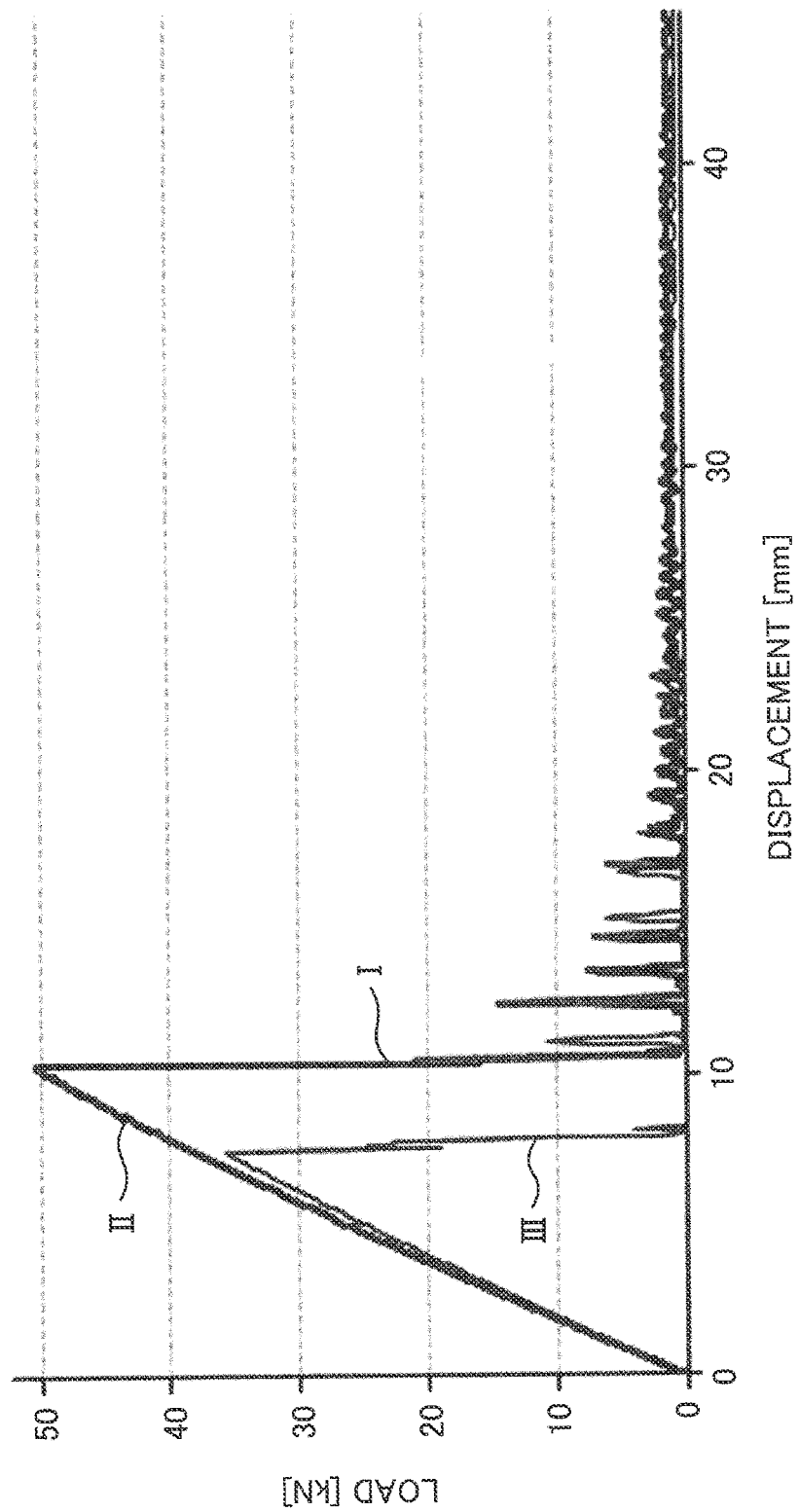
FIG. 6 is a graph showing a change in a bending load to a displacement in receipt of a bending load by each of the following frames, that is, I: a frame in Example, II: a frame in Comparative Example 1, and III: a frame in Comparative Example 2.

It is seen from the graph in FIG. 6 that I: Example (i.e., the frame 1 including the hat member 8 made of the general CFRP, i.e., constituted by the first fiber reinforced composite 6, and the plate member 9 made of the high damping CFRP, i.e., constituted by the second fiber reinforced composite 7) brings substantially the same change in the bending load as that in II: Comparative Example 1 (the frame 31 entirely made of the general CFRP), and can withstand a higher bending load than III: Comparative Example 2 (the frame 41 entirely made of the high damping CFRP).

Figure 7:
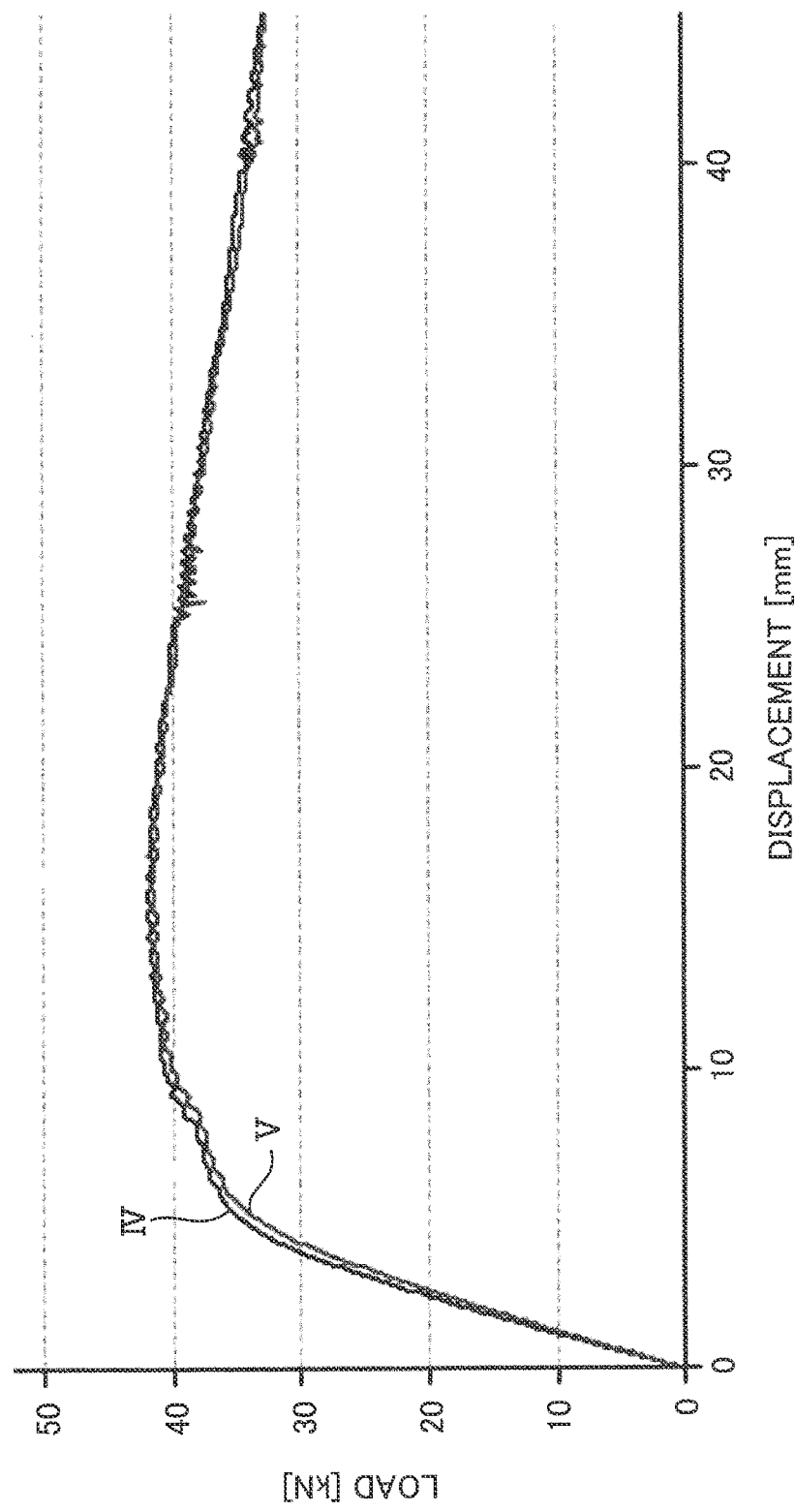
FIG. 7 is a graph showing a change in a bending load to a displacement in receipt of a bending load by each of the following frames, that is, IV: a frame in Comparative Example 3 and V: a frame in Comparative Example 4.

It is further seen from the graph in FIG. 7 that V: Comparative Example 4 (the frame 61 including the hat member 8 constituted by the steel member 16 and the plate member 9 made of a high damping CFRP) brings substantially the same change in the bending load as that in IV: Comparative Example 3 (the frame 51 entirely constituted by the steel member 16).

It is seen from the results in the graphs in FIGS. 6 to 7 that the configuration where the hat member 8 including the compressive wall part 2 is made of a material having a high strength (constituted by the first fiber reinforced composite 6 made of a general CFRP or the steel member 16) can increase the bending strength of the frame (specifically, to reach the bending strength of a frame entirely made of a material having a high strength) even though the plate member 9 including the tension wall part 4 is not made of a material having a high strength.

Subsequently, concerning the frame according to each of I: Example and II to V: Comparative Examples 1 to 4, a relation between a frequency and an inertance (acceleration/force) at various vibrations having different frequencies was investigated. Results of the investigation are shown by graphs in FIGS. 8 to 10. The inertance denotes a ratio of an acceleration to a force to be input, and represents vibration damping.

Figure 8:
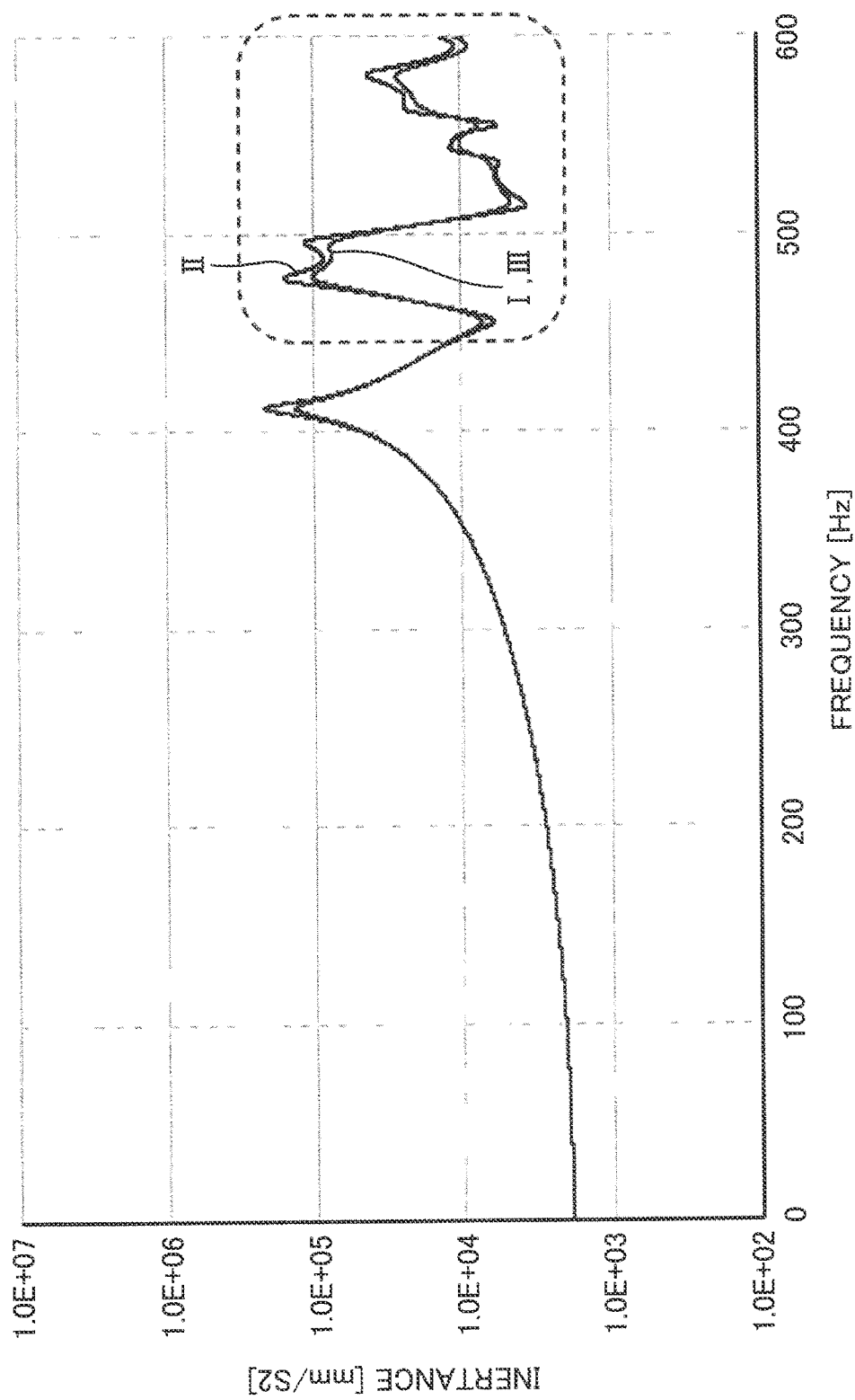
FIG. 8 is a graph showing a relation between a frequency and inertance (acceleration/force) in each of I: the frame in Example, II: the frame in Comparative Example 1, and III: the frame in Comparative Example 2.
Figure 9:
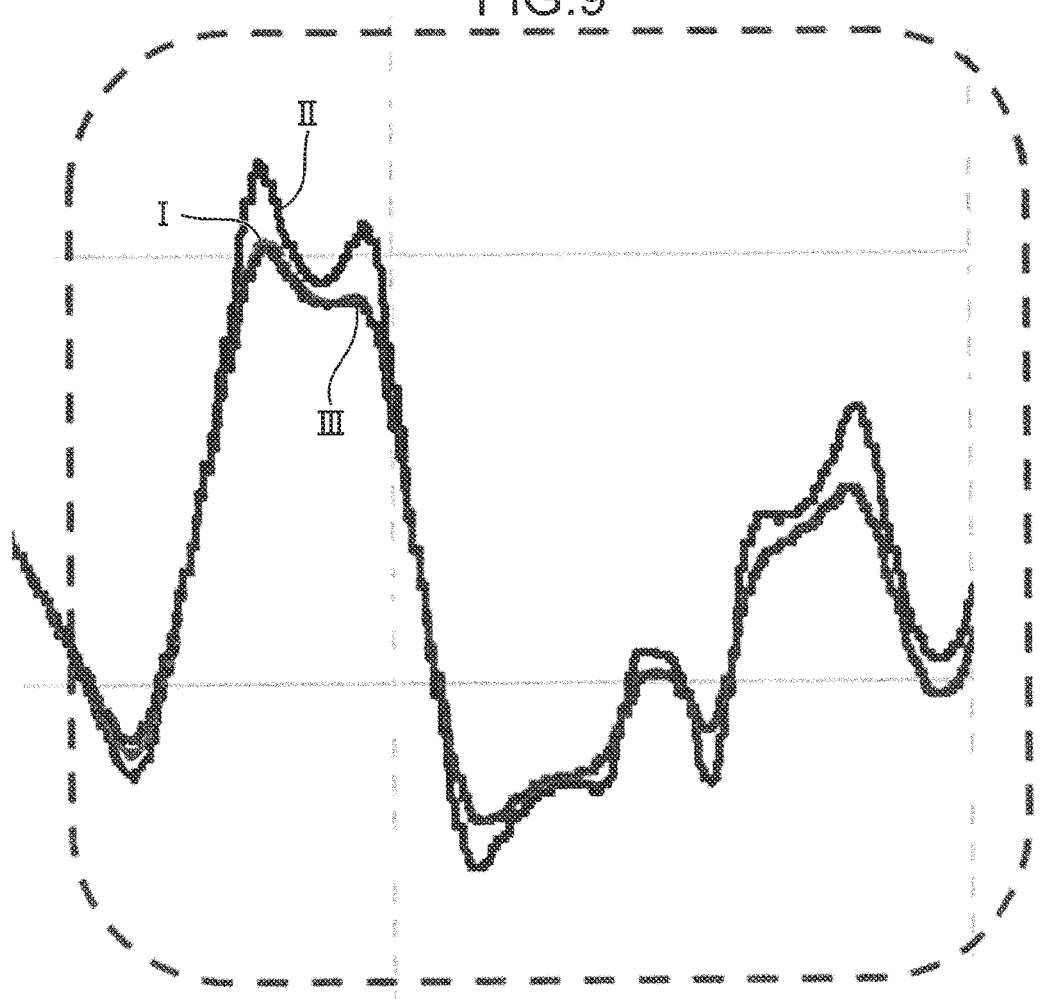
FIG. 9 is an enlarged view of a part of the graph in FIG. 8.

It is seen from the graphs in FIGS. 8 to 9 that I: Example (the structure including the hat member 8 made of the general CFRP and the plate member 9 made of the high damping CFRP) brings substantially the same inertance (acceleration/force) as that of III: Comparative Example 2 (the frame 41 entirely made of the high damping CFRP) in all the frequencies, and has a higher vibration damping capability than II: Comparative Example 1 (the frame 31 entirely made of the general CFRP).

Figure 10:
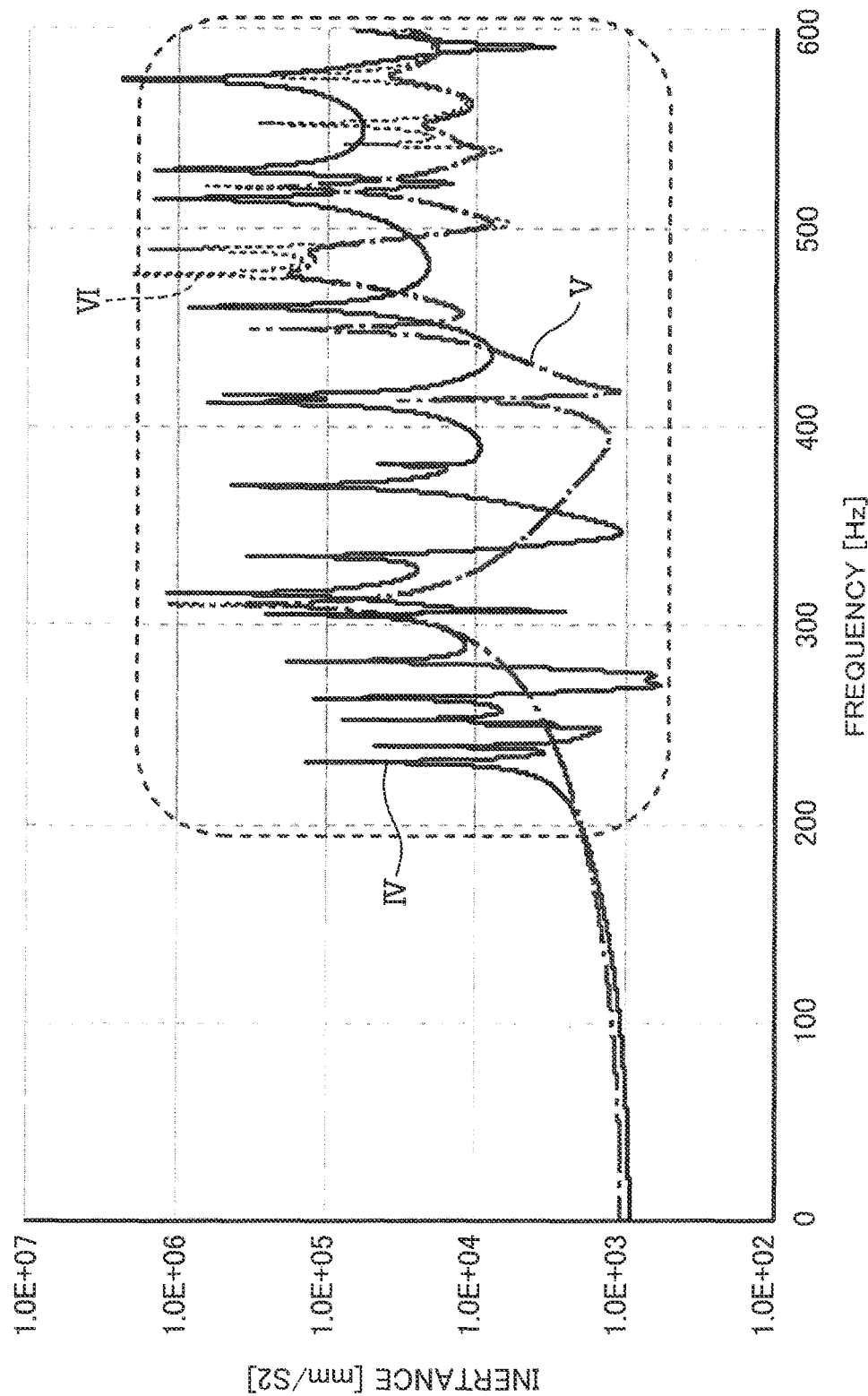
FIG. 10 is a graph showing a relation between a frequency and inertance in each of IV: the frame in Comparative Example 3 and V: the frame in Comparative Example 4.

It is further seen from the graph in FIG. 10 that V: Comparative Example 4 (the frame 61 including the hat member 8 constituted by the steel member 16 and the plate member 9 made of the high damping CFRP) has a lower inertance and a slightly higher vibration damping capability, in almost the frequencies, than IV: Comparative Example 3 (the frame 51 entirely made of the steel member 16). A vibration damping effect in V: Comparative Example 4 results from a mass reduction effect and a loss coefficient reduction effect in comparison with IV: Comparative Example 3. The state of the vibration damping resulting from only the mass reduction effect in comparison with IV: Comparative Example 3 is shown by a curve VI for reference. The curve VI has a higher peak of inertance than the curve V.

The frame 1 according to Example configured as described above achieves a simple structure including the hat member 8 (first member) constituted by the first fiber reinforced composite 6 and the plate member 9 (second member) constituted by the second fiber reinforced composite 7 having a high vibration damping capability in combination, as shown in FIG. 4. Furthermore, the hat member 8 (first member) constitutes the compressive wall part 2 and the plate member 9 (second member) constitutes the tension wall part 4, and accordingly, the compressive wall part 2 can contribute to the bending strength of the frame 1 and the tension wall part 4 can exert the vibration damping capability thereof. Consequently, the frame 1 can have both the bending strength and the vibration damping capability, with the simple structure. Additionally, an appropriate selection of a shape, a structure, and a composition of each of the first member and the second member can further lead to required bending strength and vibration damping capability of the frame 1, which is advantageous for designing and producing the frame 1.

Besides, the frame 1 according to Example includes the hat member 8, as the first member, having a hat-like cross-sectional shape and provided with the pair of flanges 10, and the plate member 9, as the second member, connected to the pair of flanges 10 to define the enclosed cross-section 1b. Therefore, the plate member 9 constituting the second member has no ridgeline (like the corner 5 in the cross-section) which the hat member 8 and the quadrangular pipe have, and thus is easily vibrable. This configuration can improve the vibration damping capability of the frame 1 by further encouraging the vibration of the tension wall part 4 included in the plate member 9. At the same time, the hat member 8 constituting the first member includes the compressive wall part 2 defining the corresponding corners 5 on its both sides, and thus can contribute to an increase in the bending stiffness.

The frame 1 having the above-described configuration according to Example is applicable to various members forming the body 121 of the vehicle and required to have a high bending strength in preparation for a possible vehicle collision, e.g., constitutes at least one selected from the group consisting of a center pillar 120, a bumper beam 122, a side sill 123, a hinge pillar 124, a front pillar 125, and the crossmember 126, as shown in FIG. 11.

In a case where the frame according to the embodiment constitutes each of the center pillar 120, the bumper beam 122, the side sill 123, the hinge pillar 124, and the front pillar 125 selected from the group, the compressive wall part 2 may be located to face outward from the body 121 (i.e., to receive the impact load). In this case, each of the compressive wall part 2 and the side wall part 3 includes the first fiber reinforced composite 6 made of, such as a general CFRP, and the tension wall part 4 includes the second fiber reinforced composite 7 made of, such as a high damping CFRP having a high vibration damping capability.

Furthermore, the crossmember 126 may include the compressive wall part 2 on either of upper and lower surfaces thereof, and the tension wall part 4 on the other of the upper and lower surfaces thereof.

Here, the center pillar 120 is a member extending in an up-down direction between a front door and a rear door at a side end of the body 121. The bumper beam 122 is a member extending in a width direction of the body 121 at a front end of the body 121 and constituting a bumper. The side sill 123 is a member extending in a front-rear direction of the body 121 at a side lower end of the body 121. The hinge pillar 124 is a member extending in the up-down direction at a side front end of the body 121 for hinging the front door thereto in the body 121. The front pillar 125 is a member extending upward and rearward (diagonally rearward) in a substantially arc shape at the opposite side-positions of a windshield at the front of the body 121. The crossmember 126 is a member extending in the width direction of the body 121 at the bottom of the body 121.

As described above, the frame 1 is applied to at least one of the center pillar 120, the bumper beam 122, the side sill 123, the hinge pillar 124, the front pillar 125, and the crossmember 126 forming the body of the vehicle. Consequently, each member can have both the bending strength and the vibration damping capability. Accordingly, each member can damp the vibration in running of the vehicle and withstand the bending load $F_B$ in receipt of the bending load $F_B$ at a vehicle collision.

Modifications

The frame 1 according to the present invention is sufficient to have an enclosed-cross sectional structure including the compressive wall part 2, the pair of side wall parts 3, and the tension wall part 4. In this structure, the tension wall part 4 is enough to have a loss coefficient which is larger than a loss coefficient of the compressive wall part 2 by 0.005 or more.

In this respect, the frame according to the present configuration covers frames having various kinds of structures in addition to the base structure of the quadrangular pipe shown in FIG. 1 and the structure including the hat member 8 and the plate member 9 in combination as shown in FIG. 4 as long as the frames have the aforementioned structure. Hereinafter, modifications of the frame will be described with reference to FIG. 12A to FIG. 17.

(A)

Figure 12A:
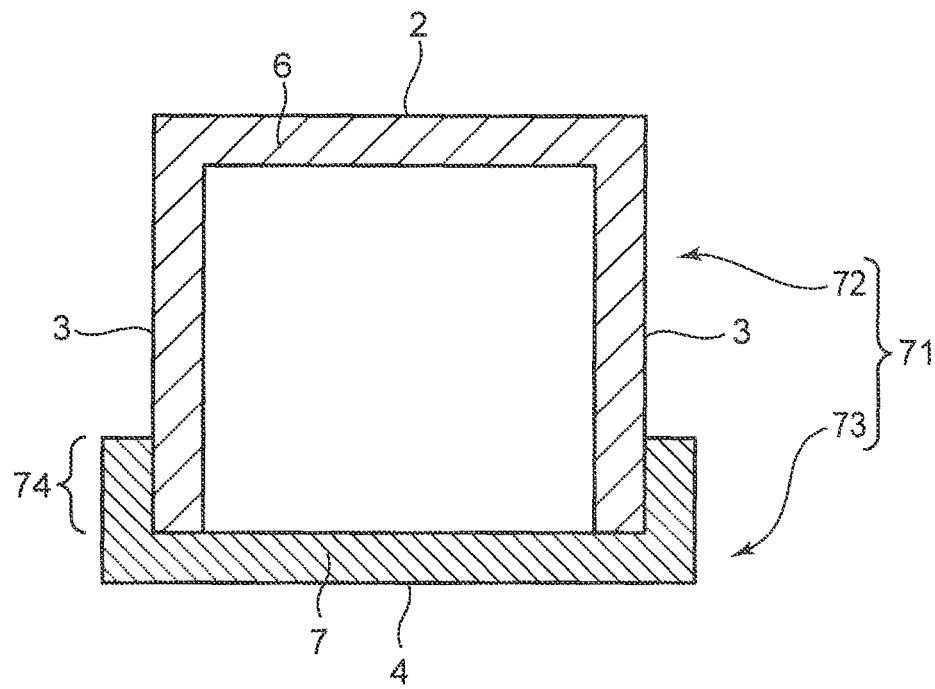
FIG. 12A is a cross-sectional explanatory view showing a cross-sectional structure of a frame, as a frame which is made of a fiber reinforced composite according to a modification of the present invention, including a first arch member constituted by a first fiber reinforced composite and a second arch member constituted by a second fiber reinforced composite having a high vibration damping capability in combination.
Figure 12B:
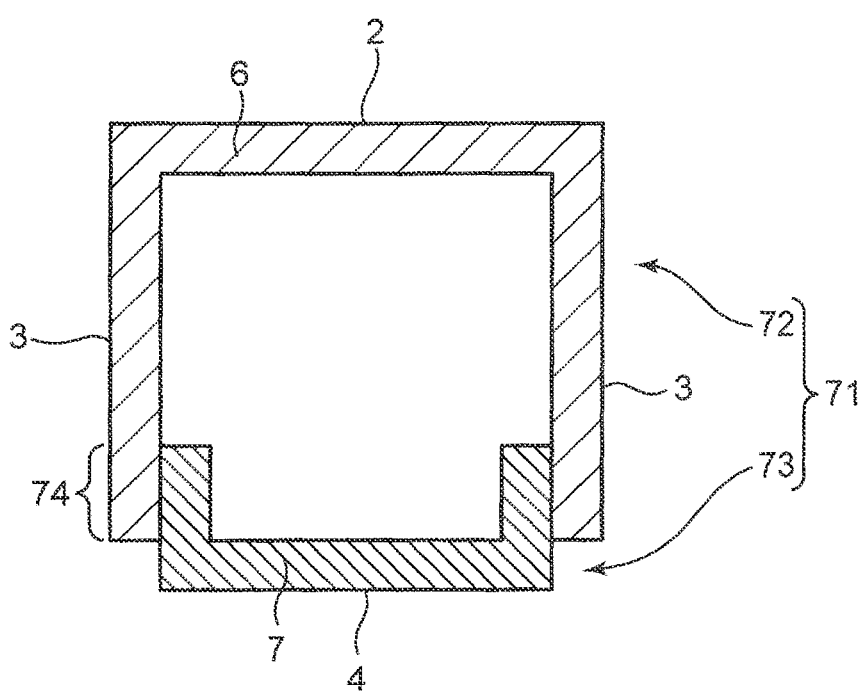
FIG. 12B is a cross-sectional explanatory view showing a cross-sectional structure of a frame, as a frame which is made of a fiber reinforced composite according to another modification of the present invention, including a first arch member constituted by a first fiber reinforced composite and a second arch member constituted by a second fiber reinforced composite having a high vibration damping capability in combination.

A frame 71 according to a modification of the present invention as shown in each of FIG. 12A and FIG. 12B has an enclosed cross-sectional structure including two members, i.e., a first arch member 72 (first member) and a second arch member 73 (second member), each having a U-cross-sectional shape.

The first arch member 72 is constituted by a first fiber reinforced composite 6 made of a general CFRP, and constitutes a compressive wall part 2 and a pair of side wall parts 3. The second arch member 73 is constituted by a second fiber reinforced composite 7 made of a high damping CFRP, and constitutes a tension wall part 4.

The first arch member 72 and the second arch member 73 have their respective ends overlapping and connected to each other to form an overlapping portion 74 on either side thereof, thereby defining one enclosed cross-section. In the overlapping portion 74, either of the first arch member 72 and the second arch member 73 is located inside, and the other of the members is located outside.

The frame 71 according to the modification configured as described above and shown in each of FIG. 12A and FIG. 12B has a simple structure including the first arch member 72 (first member) constituted by the first fiber reinforced composite 6 and the second arch member 73 (second member) constituted by the second fiber reinforced composite 7 having a high vibration damping capability in combination. Furthermore, the first arch member 72 (first member) constitutes the compressive wall part 2 and the second arch member 73 (second member) constitutes the tension wall part 4, and accordingly, the compressive wall part 2 can contribute to the bending strength of the frame 1 and the tension wall part 4 can exert the vibration damping capability of the frame. Consequently, the frame 71 can have both the bending strength and the vibration damping capability with the simple structure.

(B)

Figure 13:
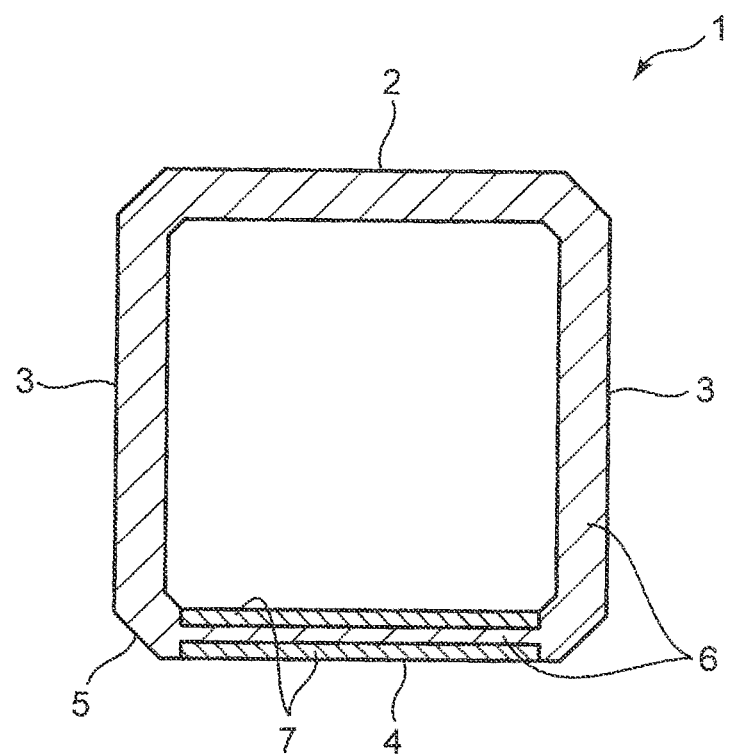
FIG. 13 is a cross-sectional explanatory view showing a cross-sectional structure of a frame, as another modification of the present invention, including a tension wall part including a first fiber reinforced composite and a second fiber reinforced composite lying on one another.

For example, as another modification of the present invention, the frame 1 configured by the quadrangular pipe shown in FIG. 1 may be modified to have a structure where a tension wall part 4 includes a first fiber reinforced composite 6 and a second fiber reinforced composite 7 lying on one another, the second fiber reinforced composite 7 having a large vibration damping capability as shown in FIG. 13.

Even in this case, the tension wall part 4 can have a loss coefficient which is larger than a loss coefficient of a compressive wall part 2 including only the first fiber reinforced composite 6 by 0.005 or more. For instance, the tension wall part 4 may have the loss coefficient adjusted to reach a required level by including one layer of the first fiber reinforced composite 6, and two layers of the second fiber reinforced composite 7.

In the configuration of the frame 1 according to the modification shown in FIG. 13, the tension wall part 4 includes the first fiber reinforced composite 6 and the second fiber reinforced composite 7 lying on one another, the second fiber reinforced composite having a higher vibration damping capability than the first fiber reinforced composite. Consequently, the frame 1 can have both the bending strength and the vibration damping capability with a simple structure.

(C)

Figure 14:
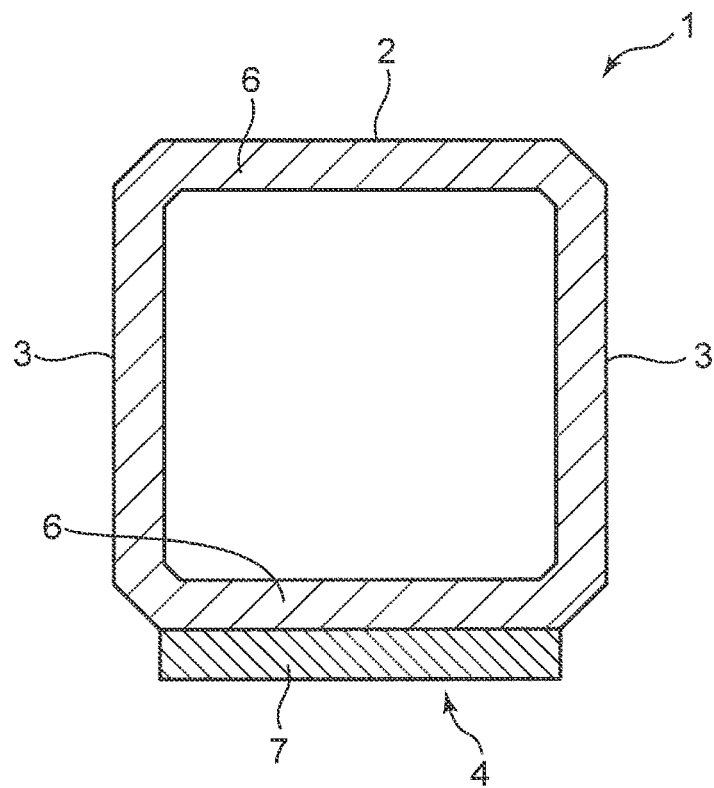
FIG. 14 is a cross-sectional explanatory view showing a cross-sectional structure of a frame, as further another modification of the present invention, configured by a quadrangular pipe made of a first fiber reinforced composite and having a surface, corresponding to the tension wall part, on which a second fiber reinforced composite formed of a sheet-like prepreg lies.

For example, as further another modification of the present invention, the frame 1 configured by a quadrangular pipe as shown in FIG. 1 is modified to have a structure where a tension wall part 4 includes a second fiber reinforced composite 7 formed of a sheet-like prepreg lying on a surface of a specific portion of the quadrangular pipe including the first fiber reinforced composite 6 and corresponding to the tension wall part 4, as shown in FIG. 14. The sheet-like prepreg may lie on a surface of the first fiber reinforced composite 6 after being placed on an outer surface of the specific portion of the quadrangular pipe corresponding to the tension wall part 4 through a specific way, e.g., thermosetting.

In the configuration of the frame 1 according to the modification shown in FIG. 14, the tension wall part 4 includes the first fiber reinforced composite 6 and the second fiber reinforced composite 7 lying on one another, the second fiber reinforced composite having a higher vibration damping capability than the first fiber reinforced composite. Consequently, the frame 1 can have both the bending strength and the vibration damping capability with a simple structure.

Particularly, the tension wall part 4 includes the first fiber reinforced composite 6 and the second fiber reinforced composite 7 formed of the sheet-like prepreg lying on the surface of the first fiber reinforced composite. Consequently, the frame 1 can have both the bending strength and the vibration damping capability with a further simple structure.

(D)

Figure 15:
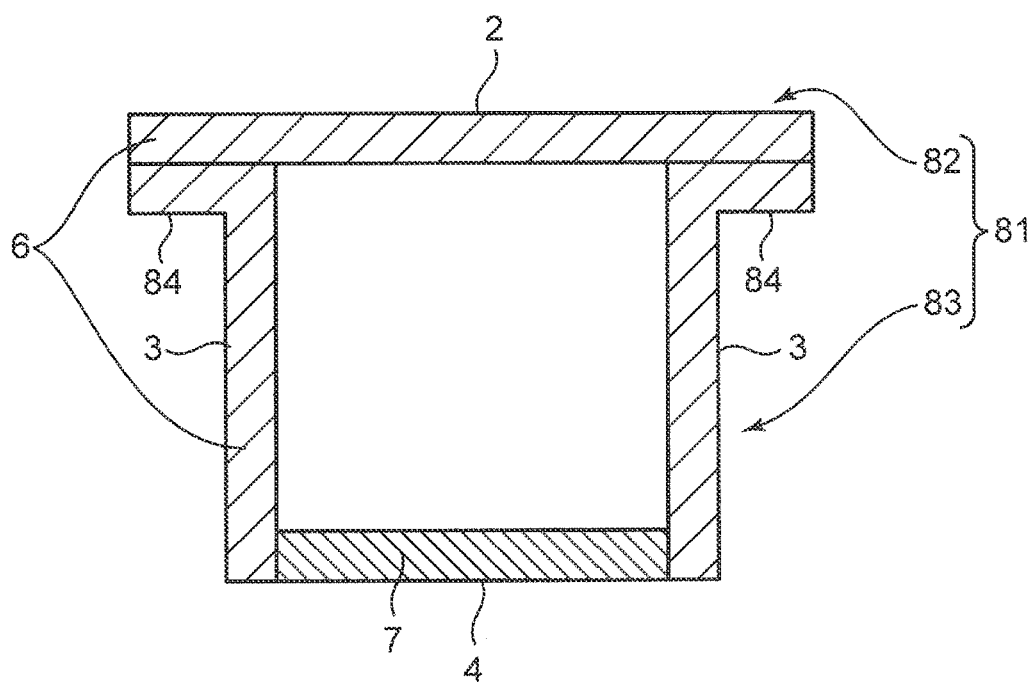
FIG. 15 is a cross-sectional explanatory view showing a cross-sectional structure of a frame, as still another modification of the present invention, including: a plate member which constitutes a compressive wall part including a first fiber reinforced composite; and a hat member which constitutes a side wall part including a first fiber reinforced composite, and constitutes a tension wall part including a second fiber reinforced composite in combination.

Moreover, a frame 81 according to still another modification of the present invention may have a reversed-hat shape as shown in FIG. 15. The frame 81 shown in FIG. 15 includes; a plate member 82 (first member) constituting a compressive wall part 2 including the first fiber reinforced composite 6; and a hat member 83 constituting a pair of side wall parts 3 each including the first fiber reinforced composite 6 and a tension wall part 4 including a second fiber reinforced composite 7. The plate member 82 is connected to a pair of flanges 84 of the hat member 83 to define an enclosed cross-section.

The frame 81 having the reversed-hat shape as shown in FIG. 15 can have both the bending strength and the vibration damping capability with a simple structure as well.

(E)

Figure 16:
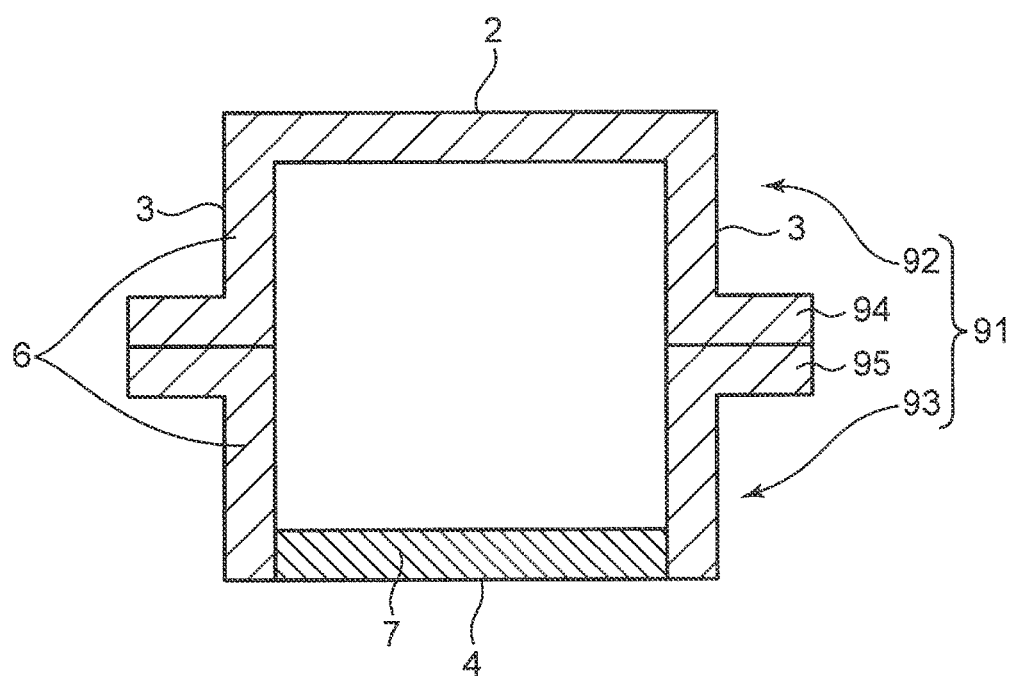
FIG. 16 is a cross-sectional explanatory view showing a cross-sectional structure of a frame, as still further another modification of the present invention, including: a first hat member which constitutes a compressive wall part and a specific portion of a side wall part each including a first fiber reinforced composite; and a second hat member which constitutes another specific portion of the side wall part including the first fiber reinforced composite and constitutes a tension wall part including a second fiber reinforced composite in combination.

Moreover, a frame 91 shown in FIG. 16 according to still further another modification of the present invention may have a structure including two hat members 92, 93 in combination. Specifically, the first hat member 92 constitutes a compressive wall part 2 and a portion (upper half portion) of a side wall part 3 each including a first fiber reinforced composite 6, and the second hat member 93 constitutes another portion (lower half portion) of the side wall part 3 including a first fiber reinforced composite 6 and a tension wall part 4 including a second fiber reinforced composite 7. A flange 94 of the first hat member 92 and a flange 95 of the second hat member 93 are connected to each other to define an enclosed cross-section.

The frame 91 including the two hat members 92, 93 in combination shown in FIG. 16 can have both the bending strength and the vibration damping capability with a simple structure as well.

(F)

Figure 17:
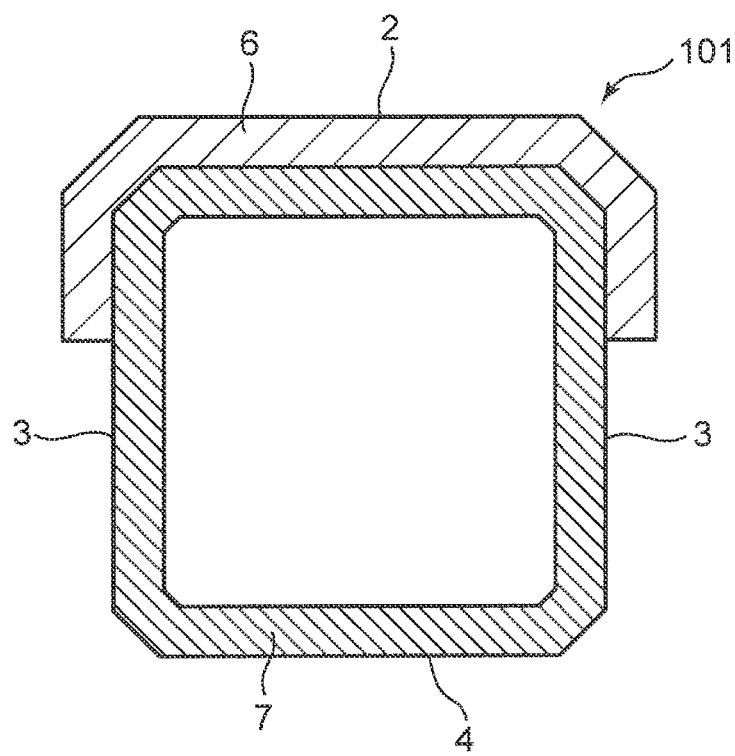
FIG. 17 is a cross-sectional explanatory view showing a cross-sectional structure of a frame, as still further another modification of the present invention, configured by a quadrangular pipe including a second fiber reinforced composite and having a surface, corresponding to a compressive wall part and a specific portion of a side wall part, on which a first fiber reinforced composite formed of a sheet-like prepreg lies.

A frame 101 shown in FIG. 17 according to still further another modification of the present invention may be configured by a quadrangular pipe where a first fiber reinforced composite 6 formed of a sheet-like prepreg lies on a surface of a specific portion of the quadrangular pipe including a second fiber reinforced composite 7 and corresponding to each of the compressive wall part 2 and a portion of the side wall part 3.

The sheet-like prepreg may fixedly lie on a surface of the second fiber reinforced composite 7 after being placed on an outer surface of the specific portion of the quadrangular pipe corresponding to each of the compressive wall part 2 and the portion of the side wall part 3 through a specific way, e.g., thermosetting, in the same manner as the frame 1 shown in FIG. 14.

The configuration of the frame 101 according to the modification shown in FIG. 17 where the compressive wall part 2 and the portion of the side wall part 3 each including the first fiber reinforced composite 6 and the second fiber reinforced composite 7 lying on one another can contributed to an increase in the bending strength of the compressive wall part 2. Consequently, the frame 101 can have both the bending strength and the vibration damping capability with a simple structure.

Particularly, the compressive wall part 2 includes the second fiber reinforced composite 7 and the first fiber reinforced composite 6 formed of the sheet-like prepreg lying on the surface of the first fiber reinforced composite. Consequently, the frame 101 can have both the bending strength and the vibration damping capability with a much simpler structure.

A frame which is made of a fiber reinforced composite as described in relation to the embodiment mainly includes the features described below. The frame which is made of a fiber reinforced composite according to the embodiment is a frame which is made of a fiber reinforced composite and has a predetermined length and an enclosed cross-section defining a plurality of corners. The frame includes: a compressive wall part where a compressive stress occurs in a longitudinal direction of the frame when the frame receives a bending load in a normal direction perpendicularly intersecting the longitudinal direction; a side wall part extending in the normal direction and defining one of corners with the compressive wall part; and a tension wall part which is away from the compressive wall part and extends in the longitudinal direction, and where a tensile stress occurs in the longitudinal direction when the frame receives the bending load. The tension wall part has a loss coefficient which is larger than a loss coefficient of the compressive wall part by 0.005 or more.

This configuration can provide a higher vibration damping effect than a configuration of a frame having a conventional enclosed cross-section defined by metal members having loss coefficients with a difference of fewer than 0.005 therebetween. The high effect is unobtainable by the combination of the metal members. Moreover, the tension wall part where a tensile stress occurs when the frame receives the bending load makes a relatively smaller contribution to the bending strength of the frame than the compressive wall part and the side wall part. Hence, the bending strength of the entirety of the frame is ensured even when a higher priority is given to an improvement in the vibration damping capability than an increase in the bending strength by increasing the loss coefficient of the tension wall part. Consequently, the frame can have both the bending strength and the vibration damping capability.

In the frame, the compressive wall part preferably includes a first fiber reinforced composite, and the tension wall part preferably includes a second fiber reinforced composite having a higher vibration damping capability than the first fiber reinforced composite.

In this configuration, the compressive wall part making a large contribution to the bending strength of the frame and including the first fiber reinforced composite further ensures the bending strength, and the tension wall part including the second fiber reinforced composite, which has a high vibration damping capability while making a small contribution to the bending strength of the frame, achieves an improvement in the vibration damping capability, the frame can have both the bending strength and the vibration damping capability. Additionally, an appropriate selection of a composition and thickness of each of the first fiber reinforced composite and the second fiber reinforced composite can further lead to required bending strength and vibration damping capability of the frame, which is advantageous for designing and producing the frame.

In the frame, the tension wall part preferably includes a first fiber reinforced composite and a second fiber reinforced composite lying on one another, the second fiber reinforced composite having a higher vibration damping capability than the first fiber reinforced composite.

In this configuration, the tension wall part includes the first fiber reinforced composite and the second fiber reinforced composite lying on one another, the second fiber reinforced composite having a higher vibration damping capability than the first fiber reinforced composite. Consequently, the frame can have both the bending strength and the vibration damping capability with a simple structure.

In the frame, preferably, the second fiber reinforced composite is formed of a sheet-like prepreg having reinforcement fibers impregnated with a resin, and lies on a surface of the first fiber reinforced composite.

In this configuration, the tension wall part includes the first fiber reinforced composite and the second fiber reinforced composite formed of the sheet-like prepreg lying on the surface of the first fiber reinforced composite. Consequently, the frame can have both the bending strength and the vibration damping capability with a much simpler structure.

Preferably, the frame further includes: a first member constituted by a first fiber reinforced composite; and a second member constituted by a second fiber reinforced composite having a higher vibration damping capability than the first fiber reinforced composite. The enclosed cross-section is preferably defined by the first member and the second member. The first member preferably constitutes the compressive wall part. The second member preferably constitutes the tension wall part.

In this configuration, the frame has a simple structure including the first member constituted by the first fiber reinforced composite and the second member constituted by the second fiber reinforced composite having the high vibration damping capability in combination. Furthermore, the first member constitutes the compressive wall part and the second member constitutes the tension wall part, and accordingly, the compressive wall part can contribute to the bending strength of the frame and the tension wall part can exert the vibration damping capability thereof. Consequently, the frame can have both the bending strength and the vibration damping capability with the simple structure. Additionally, an appropriate selection of a shape, a structure, and a composition of each of the first member and the second member can further lead to required bending strength and vibration damping capability of the frame, which is advantageous for designing and producing the frame.

In the frame, it is preferable that the first member is a hat member having a hat-like cross-sectional shape and provided with a pair of flanges, and the second member is a plate member connected to the pair of flanges to define the enclosed cross-section.

In this configuration, the second member is the plate member having no ridgeline (like the corner in the cross-section) which the hat member and the quadrangular pipe have, and thus is easily vibrable. This configuration can improve the vibration damping capability of the frame by further encouraging the vibration of the tension wall part included in the second member.

The frame preferably constitutes at least one selected from the group consisting of a center pillar, a bumper beam, a side sill, a hinge pillar, a front pillar, and a crossmember forming a body of a vehicle.

As described above, the frame is applied to at least one of the center pillar, the bumper beam, the side sill, the hinge pillar, the front pillar, and the crossmember forming the body of the vehicle. Consequently, each member can have both the bending strength and the vibration damping capability. Accordingly, each member can damp the vibration in running of the vehicle and withstand the bending load in receipt of the bending load at a vehicle collision.

The frame which is made of a fiber reinforced composite according to the embodiment can establish compatibility of the bending strength and the vibration damping capability.

This application is based on Japanese Patent application No. 2021-045404 filed in Japan Patent Office on Mar. 19, 2021, the contents of which are hereby incorporated by reference.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

The invention claimed is:

1. A frame which is made of a fiber reinforced composite and has a predetermined length and an enclosed cross-section defining a plurality of corners, the frame comprising:
   a compressive wall part where a compressive stress occurs in a longitudinal direction of the frame when the frame receives a bending load in a normal direction perpendicularly intersecting the longitudinal direction;
a side wall part extending in the normal direction and defining one of corners with the compressive wall part; and
a tension wall part which is away from the compressive wall part and extends in the longitudinal direction, and where a tensile stress occurs in the longitudinal direction when the frame receives the bending load, wherein
the tension wall part has a damping loss coefficient which is larger than a damping loss coefficient of the compressive wall part by 0.005 or more,
the compressive wall part includes a first fiber reinforced composite, and
the tension wall part includes a second fiber reinforced composite having a higher vibration damping capability than the first fiber reinforced composite.

2. The frame according to claim 1, wherein the tension wall part includes the first fiber reinforced composite and the second fiber reinforced composite lying on one another.

3. The frame according to claim 2, wherein the second fiber reinforced composite is formed of a sheet-like prepreg having reinforcement fibers impregnated with a resin, and lies on a surface of the first fiber reinforced composite.

4. The frame according to claim 1, wherein
a first member is constituted by the first fiber reinforced composite,
a second member is constituted by the second fiber reinforced composite,
the enclosed cross-section is defined by the first member and the second member,
the first member constitutes the compressive wall part, and
the second member constitutes the tension wall part.

5. The frame according to claim 4, wherein
the first member is a hat member having a hat-like cross-sectional shape and provided with a pair of flanges, and
the second member is a plate member connected to the pair of flanges to define the enclosed cross-section.

6. The frame according to claim 5, wherein the frame constitutes at least one selected from the group consisting of a center pillar, a bumper beam, a side sill, a hinge pillar, a front pillar, and a crossmember forming a body of a vehicle.

7. The frame according to claim 1, wherein the frame constitutes at least one selected from the group consisting of a center pillar, a bumper beam, a side sill, a hinge pillar, a front pillar, and a crossmember forming a body of a vehicle.

8. The frame according to claim 2, wherein the frame constitutes at least one selected from the group consisting of a center pillar, a bumper beam, a side sill, a hinge pillar, a front pillar, and a crossmember forming a body of a vehicle.

9. The frame according to claim 3, wherein the frame constitutes at least one selected from the group consisting of a center pillar, a bumper beam, a side sill, a hinge pillar, a front pillar, and a crossmember forming a body of a vehicle.

10. The frame according to claim 4, wherein the frame constitutes at least one selected from the group consisting of a center pillar, a bumper beam, a side sill, a hinge pillar, a front pillar, and a crossmember forming a body of a vehicle.

* * * * *